United States Patent
Scholer et al.

(10) Patent No.: US 11,760,216 B2
(45) Date of Patent: Sep. 19, 2023

(54) PORTABLE PLUG-IN ELECTRIC VEHICLE ALTERNATING CURRENT POWER ADAPTER AND METHOD OF USE

(71) Applicants: Richard A Scholer, Farmington Hills, MI (US); Michael J Petkus, Clarkston, MI (US); Anson Lee, St. Clair, MI (US); Brandon S Linn, Rochester Hills, MI (US)

(72) Inventors: Richard A Scholer, Farmington Hills, MI (US); Michael J Petkus, Clarkston, MI (US); Anson Lee, St. Clair, MI (US); Brandon S Linn, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 168 days.

(21) Appl. No.: 17/348,099

(22) Filed: Jun. 15, 2021

(65) Prior Publication Data
US 2022/0396159 A1    Dec. 15, 2022

(51) Int. Cl.
*B60L 53/16* (2019.01)
*B60L 53/18* (2019.01)

(52) U.S. Cl.
CPC .............. *B60L 53/16* (2019.02); *B60L 53/18* (2019.02); *B60L 2210/40* (2013.01)

(58) Field of Classification Search
CPC ................................ B60L 53/16; H02J 7/0042
USPC ........................................................ 320/109
See application file for complete search history.

(56) References Cited

U.S. PATENT DOCUMENTS

| | | | |
|---|---|---|---|
| 7,960,857 B2 | 6/2011 | King | |
| 2015/0375621 A1* | 12/2015 | Ono | H02J 7/02 307/10.1 |
| 2016/0288664 A1 | 10/2016 | Biagini et al. | |
| 2017/0050529 A1 | 2/2017 | Lambert et al. | |
| 2022/0185137 A1* | 6/2022 | Cesiel | B60L 53/16 |

* cited by examiner

*Primary Examiner* — Suchin Parihar
(74) *Attorney, Agent, or Firm* — Jeremy J. Klobucar

(57) ABSTRACT

A portable alternating current (AC) power adapter system for a plug-in electric vehicle (PEV) having a high voltage (HV) battery system and configured for bi-directional charging includes a charging connector including a first 240 volts AC (VAC) signal circuit, a second 240 VAC signal circuit, a 120 VAC ground circuit, and a proximity circuit comprising a resistor, the proximity circuit being configured to wake-up the PEV when the charging cable is connected to the plug-in charging port, and a charging power panel electrically coupled to the charging connector and including a charge plug port connected to the first and second 240 VAC signal circuits and the 120 VAC ground circuit and configured to be connected to a 120 VAC or 240 VAC external load, and a switching relay connected to the proximity circuit and configured to transition on/off to disable/enable exporting power from the HV battery system.

15 Claims, 4 Drawing Sheets

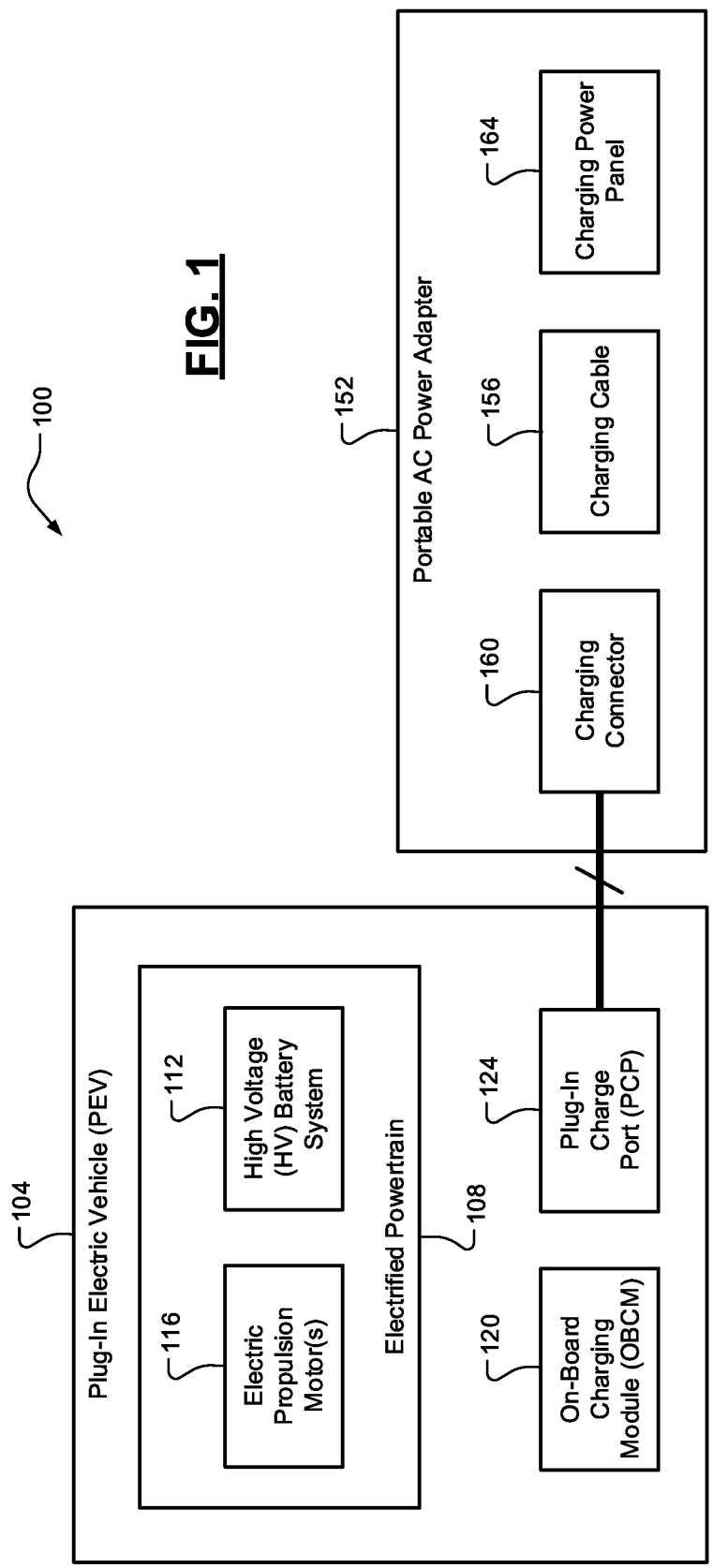

PORTABLE PLUG-IN ELECTRIC VEHICLE ALTERNATING CURRENT POWER ADAPTER AND METHOD OF USE

FIELD

The present application generally relates to plug-in electric vehicles (PEVs) and, more particularly, to a portable PEV alternating current (AC) power adapter and its method of use.

BACKGROUND

A plug-in electric vehicle (PEV), such as a battery electric vehicle (BEV) or plug-in hybrid electric vehicle (PHEV), comprises a high-voltage (HV) battery system that is rechargeable via a plug-in charging port on the PEV. An owner/operator of the PEV connects EV supply equipment (EVSE) to the plug-in charging port for charging. This EVSE typically includes a charging cable connected to a charging station, which could be located at any suitable location such as their personal residence, their workplace, or in a public parking area. While connected to the EVSE, the PEV's HV battery system is recharged via high voltage alternating current (AC) power (e.g., 240 volts alternating current, or VAC). Conventional vehicle power adapter systems include in-vehicle plugs for providing 120 VAC power but not 240 VAC power, and also may require the vehicle to be running in order to operate. Accordingly, while such vehicle power adapter systems do work for their intended purpose, there exists an opportunity for improvement in the relevant art.

SUMMARY

According to one example aspect of the invention, a portable alternating current (AC) power adapter system for a plug-in electric vehicle (PEV) having a high voltage (HV) battery system and being configured for bi-directional charging is presented. In one exemplary implementation, the system comprises: a charging cable, a charging connector configured to connect to a plug-in charging port of the PEV, the charging connector including a first 240 volts AC (VAC) signal circuit, a second 240 VAC signal circuit, a 120 VAC ground circuit, and a proximity circuit comprising a resistor, the proximity circuit being configured to wake-up the PEV when the charging cable is connected to the plug-in charging port, a charging power panel electrically coupled to the charging connector via the charging cable and including a charge plug port connected to the first and second 240 VAC signal circuits and the 120 VAC ground circuit and configured to be connected to a 120 VAC or 240 VAC external load, and a switching relay connected to the proximity circuit and configured to transition on/off to disable/enable exporting power from the HV battery system of the PEV.

In some implementations, the charging connector further comprises a physical switch configured to be operated by a user to control the proximity circuit to control a state of the proximity circuit to connect/disconnect the charging connector to/from the plug-in charging port of the PEV. In some implementations, the charging power panel further comprises an indicator light indicative of a status of the charge plug port.

In some implementations, the 120 VAC ground circuit is configured to allow current to flow therethrough to accommodate for unbalanced power being carried through the first and second 240 VAC signal circuits. In some implementations, the first and second 240 VAC signal circuits and the 120 VAC ground circuit are all independent from each other.

In some implementations, the PEV is configured for bi-directional charging via two switching relays and a direct current (DC) to AC (DC-DC) converter of an on-board charging module (OBCM) of the PEV. In some implementations, the portable AC power adapter system is portable in that it can be disconnected and transported for use amongst a plurality of PEVs having a same-type of the plug-in charging port.

In some implementations, the charging power panel further comprises an AC to direct current (AC-DC) converter to step down power being carried through at least one of the first and second 240 VAC signal circuits to provide power to recharge an internal battery for initial power of the controls and if this internal battery is low of energy a universal serial bus (USB) port is connected to the vehicle port to recharge it and allow operation.

According to another example aspect of the invention, a PEV system is presented. In one exemplary implementation, the PEV system comprises a PEV including an electrified powertrain comprising an HV battery system, OBCM comprising two relays for providing bi-directional charging of/from the HV battery system, and a plug-in charge port comprising a first 240 VAC signal circuit, a second 240 VAC signal circuit, and a 120 VAC ground circuit, and a portable AC power adapter system configured to be selectively connected to the plug-in charge port for exporting power from the HV battery system of the PEV, the portable AC power adapter system including a charging cable, a charging connector comprising the first and second 240 VAC signal circuits, the 120 VAC ground circuit, and a proximity circuit comprising a resistor and being configured to wake-up the PEV when the charging cable is connected to the plug-in charging port, and a charging power panel electrically coupled to the charging connector via the charging cable and including a charge plug port connected to the first and second 240 VAC signal circuits and the 120 VAC ground circuit and configured to be connected to a 120 VAC or 240 VAC external load, and a switching relay connected to the proximity circuit and configured to transition on/off to disable/enable exporting power from the HV battery system of the PEV.

In some implementations, the charging connector further comprises a physical switch configured to be operated by a user to control the proximity circuit to control a state of the proximity circuit to connect/disconnect the charging connector to/from the plug-in charging port of the PEV. In some implementations, the charging power panel further comprises an indicator light indicative of a status of the charge plug port.

In some implementations, the 120 VAC ground circuit is configured to allow current to flow therethrough to accommodate for unbalanced power being carried through the first and second 240 VAC signal circuits. In some implementations, the first and second 240 VAC signal circuits and the 120 VAC ground circuit are all independent from each other.

In some implementations, the portable AC power adapter system is portable in that it can be disconnected and transported for use amongst a plurality of PEVs having a same-type of the plug-in charging port. In some implementations, the charging power panel further comprises an AC-DC converter to step down power being carried through at least one of the first and second 240 VAC signal circuits to provide power to recharge an internal battery for initial power of the controls and if this internal battery is low of energy a USB port is connected to the vehicle port to recharge it and allow operation.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF THE DRAWINGS

FIG. 1 is a functional block diagram of an example plug-in electric vehicle (PEV) system including a PEV and a portable alternating current (AC) power adapter system according to the principles of the present application;

DESCRIPTION

As previously discussed, conventional vehicle power adapter systems include in-vehicle plugs for providing 120 volts alternating current (VAC) power but not 240 VAC power, and these systems may also may require the vehicle to be running in order to operate. Accordingly, a portable AC power adapter system for a PEV is presented. The portable AC power adapter system is configured to be selectively connected to a plug-in charge port of the PEV for exporting power from its high voltage (HV) battery system.

The portable AC power adapter system includes a charging cable, a charging connector comprising the first and second 240 VAC signal circuits, the 120 VAC ground circuit, and a proximity circuit comprising a resistor and being configured to wake-up the PEV when the charging cable is connected to the plug-in charging port, and a charging power panel electrically coupled to the charging connector via the charging cable and including a charge plug port connected to the first and second 240 VAC signal circuits and the 120 VAC ground circuit and configured to be connected to a 120 VAC or 240 VAC external load, and a switching relay connected to the proximity circuit and configured to transition on/off to disable/enable exporting power from the HV battery system of the PEV. While EV charging in compliance with the Society of Automotive Engineers (SAE) J1172 standard is generally described herein, it will be appreciated that these techniques could be applicable to other suitable charging standards.

Figure 2A:
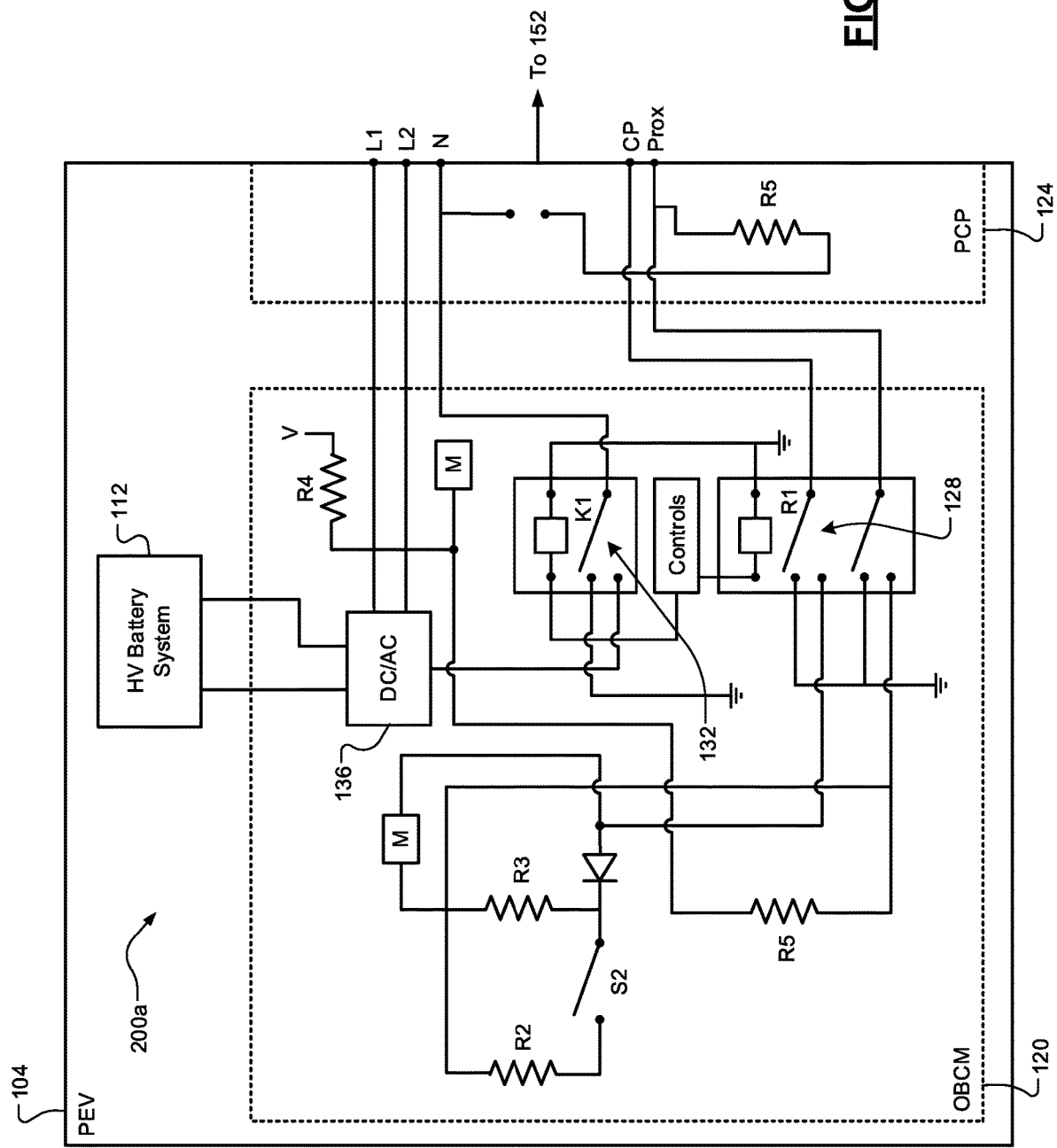
FIGS. 2A-2B are circuit diagrams of an example configuration of the PEV system of FIG. 1 according to the principles of the present application.
Figure 2B:
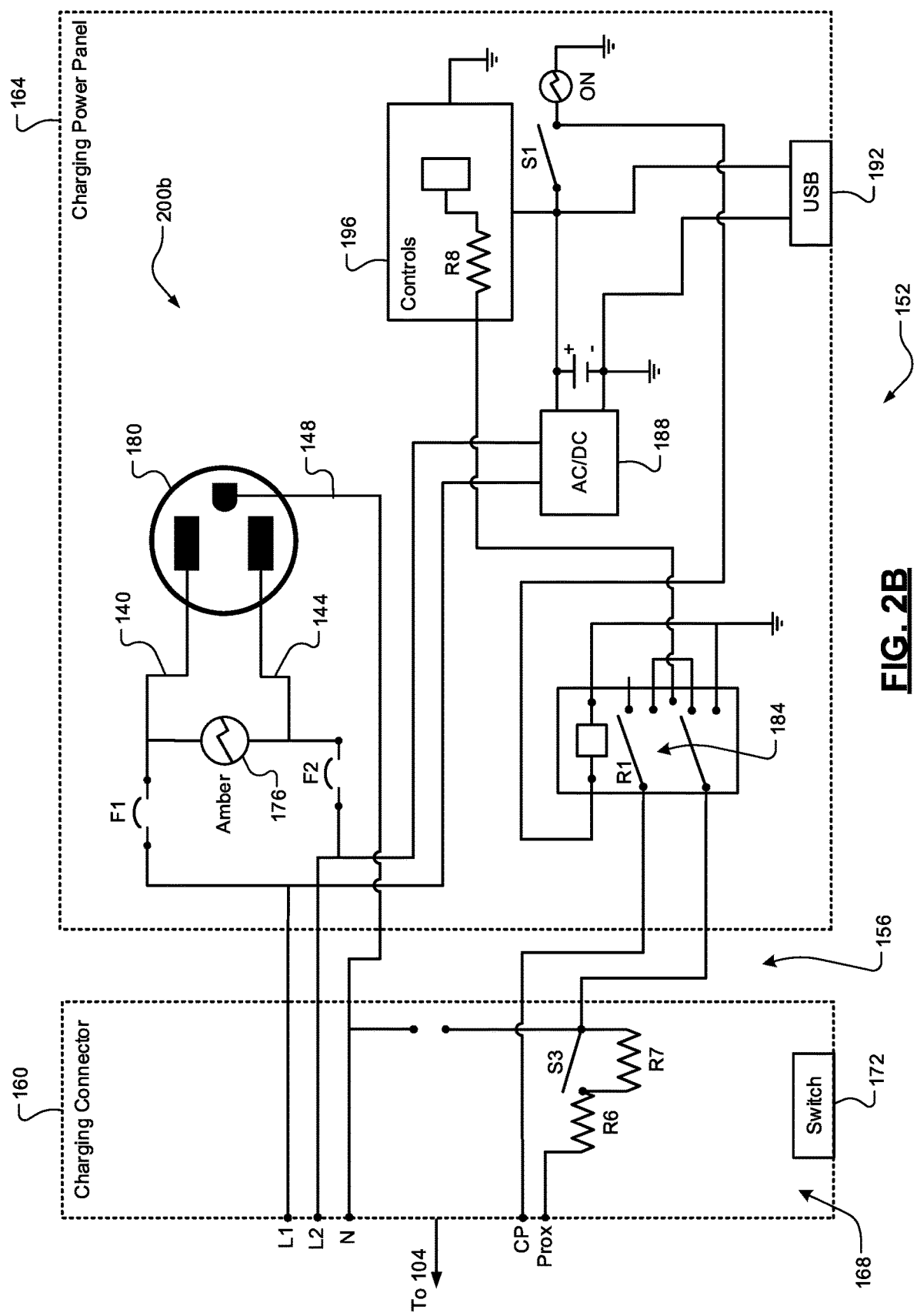

Referring now to FIGS. 1 and 2A-2B, a functional block diagram of an example PEV system 100 and circuit diagrams 200a, 200b of one example configuration of the PEV system 100 according to the principles of the present application are illustrated. The PEV system 100 comprises a PEV 104 (a battery electric vehicle (BEV), a plug-in hybrid electric vehicle (PHEV), etc.) having an electrified powertrain 108 comprising a HV battery system 112 and one or more electric traction motors 116 for propulsion of the PEV 104. The PEV 104 further includes an on-board charging module (OBCM) 120 connected to a plug-in charge port (PCP) 124. The OBCM 120 comprises two relays (R1, K1) 128, 132 for providing bi-directional charging of/from the HV battery system 112 using one or more AC/DC converters 136 and a controls circuit for controlling recharging/off-load charging. The plug-in charge port 124 comprises a first 240 volts AC (VAC) signal circuit 140, a second 240 VAC signal circuit 144, and a 120 VAC ground circuit 148. The OBCM 120 further comprises other circuits and components including, but not limited to, resistors R2 (e.g., ~1.3 kiloohms (kΩ)), R3 (e.g., ~2.74 kΩ), R4 (e.g., ~330Ω), and R5 (e.g., ~2.7 kΩ), a diode, a switch S2, and a low voltage source V (e.g., ~5 V). The PCP 124 comprises the initial resistor R5 (e.g., ~2.7 kΩ) that needs to be disconnected from the 120 VAC ground circuit 148 for this application, since this is now part of the OBCM. The PEV system 100 further comprises a portable AC power adapter system 152 according to the principles of the present application.

The portable AC power adapter system 152 is portable in that it can be disconnected and transported for use amongst a plurality of PEVs having a same-type of the plug-in charging port (i.e., a same type as plug-in charge port 124). The portable AC power adapter system 152 generally comprises a charging cable 156 electrically connected between a charging connector 160 and a charging power panel 164. The charging connector 160 is configured to be selectively connected to the plug-in charge port 124 of the PEV 104. The charging connector 160 includes the first and second 240 VAC signal circuits 140, 144 and the 120 VAC ground circuit 148. These three circuits 140, 144, 148 are all independent of each other at least for purposes of the charging connector 160.

The charging connector 160 further comprises a proximity circuit 168 comprising resistors R6 (e.g., ~150Ω), R7 (e.g., ~330Ω), relay S3 (e.g., normally closed), and an optional physical switch 172 that needs to be disconnected from the 120 VAC ground circuit 148 for this application since it now connects to Relay R1 184. The proximity circuit 168 is configured to, upon connection of the charging connector 160 to the plug-in charge port 124, wakeup the PEV 104 for power exporting (similar to wake-up the PEV for recharging). This can include, for example, configuring the two relays R1 128, K1 132 to enable power exportation (i.e., DC-to-AC conversion and exportation. In one example implementation, the physical switch 172 (shown as S3) is configured to be operated by a user to control the proximity circuit 168 to control a state of the proximity circuit 168 to connect/disconnect the charging connector 160 to/from the plug-in charging port 124 of the PEV 104.

The charging power panel 164 comprises an indicator light 176 indicative of a status of a charge plug port 180 connected to the first and second 240 VAC signal circuits 140, 144 and the 120 VAC ground circuit 148 (via the charging cable 156) and with two fuses F1 (e.g., ~40 amps, or A) and F2 (e.g., ~40 A) thereabout. The 120 VAC ground circuit 148, for example, could be configured to allow current to flow therethrough to accommodate for unbalanced power being carried through the first and second 240 VAC signal circuits 140, 148. This would normally not occur or otherwise be necessary during balanced PEV recharging. The charging power panel 164 further comprises a switching relay R1 184 connected to the proximity circuit 168 (via the charging cable 156) and configured to transition on/off to disable/enable exporting power from the HV battery system 112 of the PEV 104.

In one example implementation, the charging power panel 164 further comprises an AC-DC converter 188 to step down power being carried through at least one of the first and second 240 VAC signal circuits to provide power to recharge an internal battery (+/−) used to initiate the V2L controls. If this internal battery is not able to power the controls due to extended storage times, a universal serial bus (USB) port 192 (e.g., is used for initial power of the panel control circuit 196). This control circuit 196 controls operation of the charging power panel 196, e.g., via resistor R8 (e.g., ~1 kΩ) and an oscillator (e.g., a 4 kilohertz (kHz) pulse-width modulation (PWM) signal generator) identifying to the vehicle that the power panel is connected and ready to use. The charging power panel 164 further comprises other circuits and components including, but not limited to, the internal battery, a switch S1, and an ON light as shown.

The proximity circuit 168 is generated from the vehicle 100 and the pilot 196 is normally generated from the EVSE for charging. The both normally use the ground circuit 148 for return; however, with the 240V power panel 164 the ground is a current carrying conductor as are the two circuits 140 and 144. The relays R1 184 and R1 128 switch the proximity circuit 168 and pilot 196 to use each other as the return circuit while K1 132 switches the ground from charging to power panel modes.

Figure 3:
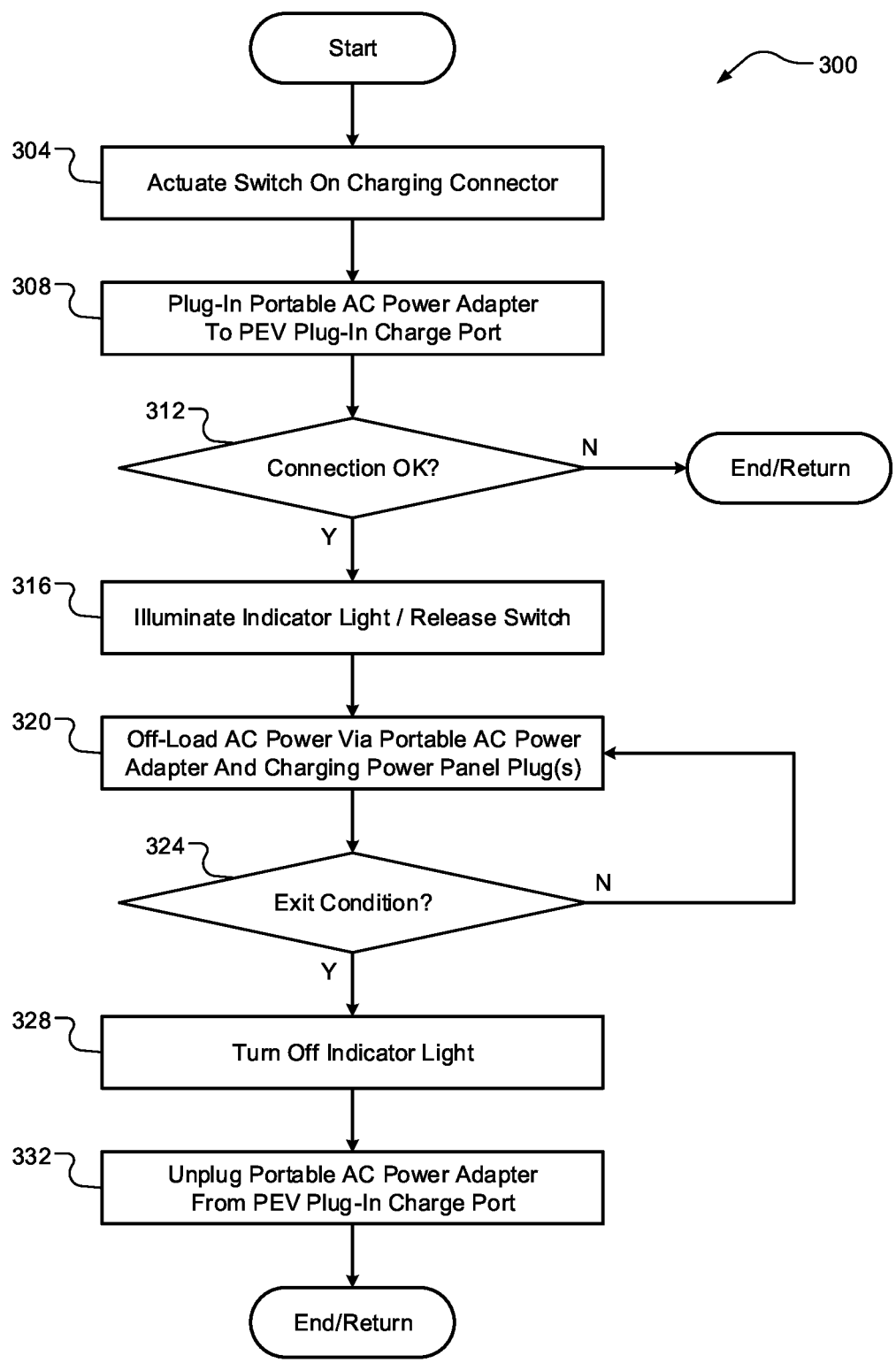
FIG. 3 is a flow diagram of an example method of operating the example portable PEV AC power adapter system according to the principles of the present application.

Referring now to FIG. 3, a method 300 of operating a portable AC power adapter system according to the principles of the present disclosure. While the specific configuration 200a, 200b of the portable AC power adapter and the PEV 104 are specifically referenced, it will be appreciated that this method 300 could be applicable to slightly different configurations of the PEV 104 and/or the portable AC power adapter 152. At optional 304, the user actuates the optional physical switch 172 on the charging connector 160. At 308, the user plugs the charging connector 160 into the plug-in charging port 124 of the PEV 104. At 312, it is determined whether a proper connection has been made. This could include the PEV 104 waking up and being prepared to off-load AC power via the portable AC power adapter 152.

Preconditions could include, for example only, a secure physical connection and a state of charge (SOC) of the HV battery system 112 at an appropriate level (i.e., high enough) for AC power exportation. When false, the method 300 ends or returns to 308. When true, the method 300 proceeds to 316 where the charging power panel 164 illuminates the light 176 indicating that AC power exportation via plug 180 is ready. The user could also then release the physical switch 172 on the charging connector 160. At 320, AC power exportation occurs via the plug 180 and/or the USB port 192 (DC converted AC power).

At 324, it is determined whether an exit condition has occurred. This could include, for example only, the user depressing the physical switch 172 to actuate the proximity circuit 168 and interrupt/stop charge off-loading. This could also include, for example, the SOC of the HV battery system 112 falling below a threshold level. In other words, charge off-loading should not occur past a certain point in order to not strand the PEV 104 somewhere without sufficient charge to power the electrified powertrain 108. When false, the method 300 returns to 320 and charge off-loading continues. When true, however, the method 300 proceeds to 328 where the indicator light 176 is turned off indicating that AC power is no longer available at the plug 180 of the charging power panel 164 and then at 332 the user safely unplugs the charging connector 160 from the plug-in charge port 124 and the method 300 ends or returns to 304 for another possible cycle.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A portable alternating current (AC) power adapter system for a plug-in electric vehicle (PEV) having a high voltage (HV) battery system and being configured for bi-directional charging, the system comprising:
   a charging cable;
   a charging connector configured to connect to a plug-in charging port of the PEV, the charging connector including:
      a first 240 volts AC (VAC) signal circuit;
      a second 240 VAC signal circuit;
      a 120 VAC ground circuit; and
      a proximity circuit comprising a resistor, the proximity circuit being configured to wake-up the PEV when the charging cable is connected to the plug-in charging port; and
   a charging power panel electrically coupled to the charging connector via the charging cable and including:
      a charge plug port connected to the first and second 240 VAC signal circuits and the 120 VAC ground circuit and configured to be connected to a 120 VAC or 240 VAC external load; and
      a switching relay connected to the proximity circuit and configured to transition on/off to disable/enable exporting power from the HV battery system of the PEV.

2. The portable AC power adapter system of claim 1, wherein the charging connector further comprises a physical switch configured to be operated by a user to control the proximity circuit to control a state of the proximity circuit to connect/disconnect the charging connector to/from the plug-in charging port of the PEV.

3. The portable AC power adapter system of claim 2, wherein the charging power panel further comprises an indicator light indicative of a status of the charge plug port.

4. The portable AC power adapter system of claim 1, wherein the 120 VAC ground circuit is configured to allow current to flow therethrough to accommodate for unbalanced power being carried through the first and second 240 VAC signal circuits.

5. The portable AC power adapter system of claim 4, wherein the first and second 240 VAC signal circuits and the 120 VAC ground circuit are all independent from each other.

6. The portable AC power adapter system of claim 1, wherein the PEV is configured for bi-directional charging via two switching relays and a direct current (DC) to AC (DC-DC) converter of an on-board charging module (OBCM) of the PEV.

7. The portable AC power adapter system of claim 1, wherein the portable AC power adapter system is portable in that it can be disconnected and transported for use amongst a plurality of PEVs having a same-type of the plug-in charging port.

8. The portable AC power adapter system of claim 1, wherein the charging power panel further comprises an AC to direct current (AC-DC) converter to step down power being carried through at least one of the first and second 240 VAC signal circuits to provide power to recharge the internal battery for initial power of the controls and if this internal battery is low of energy the universal serial bus (USB) port is connected to the vehicle port to recharge it and allow operation.

9. A plug-in electric vehicle (PEV) system, comprising:
a PEV including:
an electrified powertrain comprising a high voltage (HV) battery system,
an on-board charging module (OBCM) comprising two relays for providing bi-directional charging of/from the HV battery system,
a plug-in charge port comprising a first 240 volts AC (VAC) signal circuit, a second 240 VAC signal circuit, and a 120 VAC ground circuit; and
a portable AC power adapter system configured to be selectively connected to the plug-in charge port for exporting power from the HV battery system of the PEV, the portable AC power adapter system including:
a charging cable,
a charging connector comprising the first and second 240 VAC signal circuits, the 120 VAC ground circuit, and a proximity circuit comprising a resistor and being configured to wake-up the PEV when the charging cable is connected to the plug-in charging port, and
a charging power panel electrically coupled to the charging connector via the charging cable and including:
a charge plug port connected to the first and second 240 VAC signal circuits and the 120 VAC ground circuit and configured to be connected to a 120 VAC or 240 VAC external load, and
a switching relay connected to the proximity circuit and configured to transition on/off to disable/enable exporting power from the HV battery system of the PEV.

10. The PEV system of claim 1, wherein the charging connector further comprises a physical switch configured to be operated by a user to control the proximity circuit to control a state of the proximity circuit to connect/disconnect the charging connector to/from the plug-in charging port of the PEV.

11. The PEV system of claim 10, wherein the charging power panel further comprises an indicator light indicative of a status of the charge plug port.

12. The PEV system of claim 9, wherein the 120 VAC ground circuit is configured to allow current to flow therethrough to accommodate for unbalanced power being carried through the first and second 240 VAC signal circuits.

13. The PEV system of claim 12, wherein the first and second 240 VAC signal circuits and the 120 VAC ground circuit are all independent from each other.

14. The PEV system of claim 9, wherein the portable AC power adapter system is portable in that it can be disconnected and transported for use amongst a plurality of PEVs having a same-type of the plug-in charging port.

15. The PEV system of claim 9, wherein the charging power panel further comprises an AC to direct current (AC-DC) converter to step down power being carried through at least one of the first and second 240 VAC signal circuits to provide power to recharge the internal battery for initial power of the controls and if this internal battery is low of energy the universal serial bus (USB) port is connected to the vehicle port to recharge it and allow operation.

* * * * *